(12) United States Patent
Golliffe et al.

(10) Patent No.: US 7,059,974 B1
(45) Date of Patent: Jun. 13, 2006

(54) GOLF BALLS WITH IMPACT RESISTANT IDENTIFICATION DEVICE

(75) Inventors: Steven P. Golliffe, Eastcote (GB);
David V. Jolliffe, Eastcote (GB);
Geoffrey Emmerson, Eastcote (GB)

(73) Assignee: World Golf Systems Ltd., Eastcote (GB)

( * ) Notice: Subject to any disclaimer, the term of this patent is extended or adjusted under 35 U.S.C. 154(b) by 280 days.

(21) Appl. No.: 10/019,767

(22) PCT Filed: Jun. 27, 2000

(86) PCT No.: PCT/GB00/02461

§ 371 (c)(1),
(2), (4) Date: Apr. 12, 2002

(87) PCT Pub. No.: WO01/02060

PCT Pub. Date: Jan. 11, 2001

(30) Foreign Application Priority Data

Jun. 30, 1999 (GB) .................................. 9915331.4

(51) Int. Cl.
*A63B 37/00* (2006.01)
(52) U.S. Cl. ........................ 473/351; 473/353; 473/367
(58) Field of Classification Search ................ 473/351, 473/353, 367
See application file for complete search history.

(56) References Cited

U.S. PATENT DOCUMENTS

| | | | | | |
|---|---|---|---|---|---|
| 3,782,730 | A | * | 1/1974 | Horchler | 473/353 |
| 5,582,550 | A | * | 12/1996 | Foley | 473/153 |
| 5,626,531 | A | * | 5/1997 | Little | 473/353 |
| 5,743,815 | A | * | 4/1998 | Helderman | 473/353 |
| 5,820,484 | A | * | 10/1998 | Terry | 473/356 |
| 5,910,057 | A | * | 6/1999 | Quimby et al. | 473/353 |
| 6,021,949 | A | * | 2/2000 | Boiron | 235/492 |
| 6,113,504 | A | * | 9/2000 | Kuesters | 473/353 |
| 6,164,551 | A | * | 12/2000 | Altwasser | 235/492 |
| 6,255,949 | B1 | * | 7/2001 | Nicholson et al. | 340/572.8 |
| 6,296,190 | B1 | * | 10/2001 | Rendleman | 235/492 |
| 6,620,057 | B1 | * | 9/2003 | Pirritano et al. | 473/353 |

* cited by examiner

Primary Examiner—John M. Hotaling, II
(74) Attorney, Agent, or Firm—Sheridan Ross P.C.

(57) ABSTRACT

A golf ball having an identification device (10) embedded in it comprises an aerial (14) and a coded chip (12), which are associated with a resilient member (16) arranged to dampen shock form impact. The resilient members is in the form of a diaphragm (16), to which the chip (12) and aerial (14) are separately connected. The above components, mounted on an insulating plate (11), are moulded in a capsule (20) which is then placed at the center of a golf ball core.

13 Claims, 2 Drawing Sheets

GOLF BALLS WITH IMPACT RESISTANT IDENTIFICATION DEVICE

The present invention relates to balls, especially golf balls, incorporating an identification device.

U.S. Pat. No. 5,743,815 discloses such an arrangement, in which a passive transponder is surrounded by elastic material and a rigid housing to produce a coded golf ball. U.S. Pat. No. 3,782,730 also shows a golf ball with an oscillator circuit which is surrounded by a resistant sphere and which is to aid location of the ball. GB patent 1,172,449 discloses a radio emitter arranged in the liquid composition at the centre of a golf ball.

Coded golf balls are necessary in order to efficiently run golf driving ranges as those disclosed in our co-pending patent application PCT/GB99/00883.

A problem with prior arrangements is to provide a sufficiently reliable identification device which is robust enough to withstand the shock of repeated impacts with a golf club. Another problem is the need to withstand the extreme conditions of temperature and pressure required during the manufacture of golf balls. In addition the identification device should have no effect on the performance of the golf ball in use.

The present invention seeks to overcome or reduce one or more of the above problems.

According to a first aspect of the present invention, there is provided a golf ball having an identification device embedded therein, the identification device comprising a coded element and an aerial, wherein the coded element and/or the aerial is/are associated with a resilient member arranged to dampen mechanical shocks thereto.

The identification device is preferably a radio frequency identification device.

The coded element may be mounted in or on a plate with the aerial being formed by a coil arranged on one face of the plate and the resilient member being arranged on the opposite face of the plate.

In preferred arrangements the resilient member is in the form of a diaphragm and the coded element, in the form of a chip, is connected to the diaphragm. The aerial coil is separately connected to the diaphragm, so that the diaphragm may also serve to electrically connect the chip and the aerial coil.

The resilient member is preferably made of such a material that it can serve as a heat sink during subsequent manufacturing stages of the golf ball to prevent overheating of the coded element and/or the aerial.

According to a second aspect of the present invention, there is provided a method of manufacturing a golf ball incorporating an identification device, the method including the steps of moulding the identification device in a disc member, placing the disc member between two parts of a ball core, adhering the core parts to each other around the disc member, and then subjecting the thus-formed core to further processing steps, including providing it with a covering.

The core parts are preferably symmetrical and may be hemispherical of cuboid shape (to form a cuboid core which is subsequently processed to have a spherical shape).

Means for protecting the identification device from the effects of impacts are preferably also moulded in the disc member.

Preferred embodiments of the present invention will now be described, by way of example only, with reference to the accompanying drawings, of which:

Figure 1:
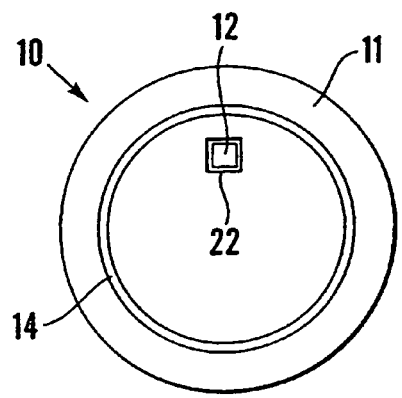
FIG. 1 shows a top plan view of an identification device for use in an embodiment of the present invention.
Figure 2:
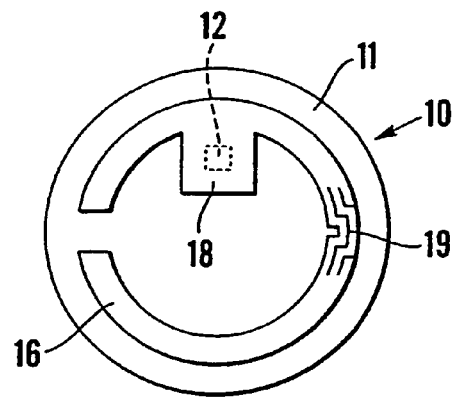
FIG. 2 shows a bottom plan view of the device of FIG. 1.

Referring to the drawings, FIGS. 1 and 2 show an identification device 10 comprising a substrate formed by an insulating plate 11 e.g. of a plastics material such as any polyvinyl chloride product with the necessary temperature characteristics. The identification device is a passive device and includes an ASIC chip 12 with a 64 bit memory which can be read only or may have both read and write functions. The device operates at radio frequency preferably in the range 66 kHz–13.56 MHz. It also comprises a generally circular copper coil aerial 14 and arranged to receive interrogation signals from external readers and to transmit an appropriate response. The code within the coded response of the aerial 14 is stored in the memory of chip 12.

On the opposite major surface of plate 11, there is provided an annular or coiled shock absorbing member in the form of a steel diaphragm 16. Diaphragm 16 has a tongue 18 and a meandering section or castellation 19 which assists in bonding to the plate 11. The diaphragm is resiliently mounted, e.g. on a spring part, so as to protect the identification device from the impact of a golf club.

The physical arrangement is such that the chip 12 is mounted on the back of tongue 18 of the diaphragm 16 as seen in FIG. 2; this enables the diaphragm to act as an effective heat sink for chip 12 during processing of the core. The chip 12 extends through a hole 22 in the plate 11 but without being directly attached to the plate. The aerial coil 14 is separately attached to the diaphragm 16 by a connection passing through the plate 11; this means that the diaphragm can serve as a conductive link for signals passing between aerial 14 and chip 12.

Figure 3:
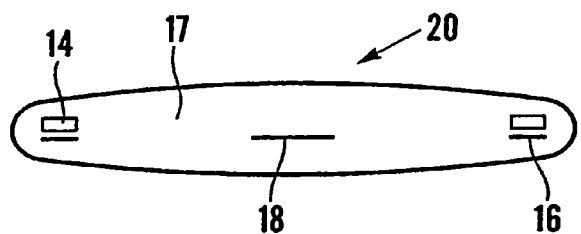
FIG. 3 shows the device of FIGS. 1 and 2 encapsulated in a capsule.

The plate 11, with the various components mounted thereon, is then located in a mould, and epoxy resin material 17 is then cast around it to form a disc member or capsule 20, FIG. 3. The capsule provides high impact absorption and bonding for the plate arranged substantially along its central plane. As the material of the capsule sets, the difference between the thermal setting properties of the different materials enables the diaphragm to "set-back", giving room for relative movement after setting. Typical maximum dimensions of the capsule are diameter 17 mm and depth 3.5 mm.

Figure 4A:
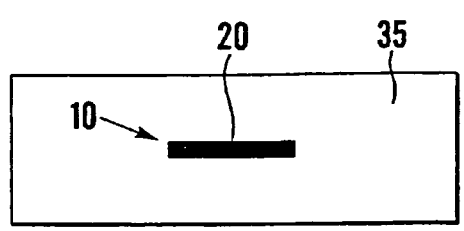
FIGS. 4a and 4b show the device of FIG. 3 is embedded in a core of cuboid shape.
Figure 4B:
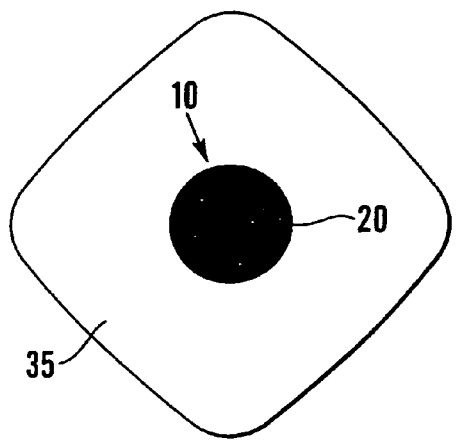

As shown in FIGS. 4a and 4b, the capsule 20 is then positioned within a pre-manufactured soft synthetic rubber billet or core 35 of generally cuboid shape. This is done by slicing the spherical billet in half, cleaning the cut surfaces with solvent, coating the capsule with a bonding solution to improve adhesion and to prevent delamination, placing the capsule carefully at the centre of the billet 35, and bonding the two halves of the billet together again. Here, it is important that the capsule 20 is located centrally of the loaded synthetic rubber/chalk pre-manufactured core 35. This can be done manually or automatically with a specially-designed tool. The capsule 20 should be oriented with its major surfaces parallel to the major surfaces of the core 35.

The accurate location of the capsule 20 within each billet half, can be assisted by cutting or machining an appropriately shaped recess.

The billet is then subjected to a conventional manufacturing process during which it reaches temperatures of 200°

Figure 5:
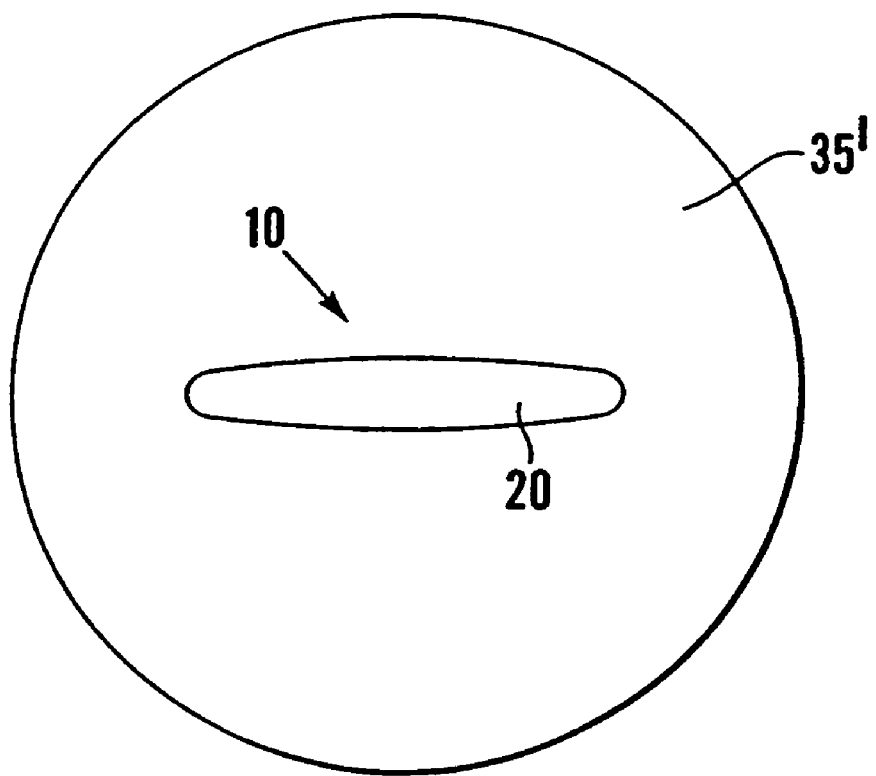
FIG. 5 shows the core of FIG. 4 after a further processing step.

C. and pressures of up to 15.4 MN/m² (1 ton/square inch) as the rubber compound vulcanises and adopts a spherical form 35', FIG. 5. During the heating process, the diaphragm 16 further serves as a heat sink for the chip 12 and the rest of the identification device, which is thus prevented from thermal damage. A conventional dimpled cover of material sold under the trade name of Surlyn or similar material is subsequently applied as the outer layer of the ball.

A ball manufactured as above is within the normal weight specification (maximum 45.93 grams) and performs exactly as a normal ball, i.e. it looks and feels the same and the presence of the identification device does not affect the flight, trajectory, run, distance or dispersion of the ball in use.

In addition, alternative arrangements may be provided for absorbing shocks. For example, in one modification, electronic circuitry is mounted on an aerial coil which in turn is mounted on a spring.

The identification system could be used in other sorts of balls, e.g. tennis balls, or any other type of object which undergoes rough treatment.

Instead of uniquely identifying the ball or other object, the device may simply be part of a presence-sensing system, e.g. as an aerial to locating lost golf balls.

The invention claimed is:

1. A golf ball comprising a core with an identification device located in a capsule embedded in the core, the identification device comprising a coded element and an aerial wherein the identification device further comprises a diaphragm having a resilient mounting, and the coded element being mounted on the diaphragm, and wherein the capsule surrounds the diaphragm with space for relative movement therebetween.

2. A golf ball according to claim 1 further comprising a plate located within said capsule and having first and second major surfaces facing in opposite directions, wherein said diaphragm has a resilient mounting on said first major surface and said aerial is mounted on said second major surface.

3. A golf ball according to claim 2, wherein said diaphragm comprises a tongue and said coded element is mounted on said tongue.

4. A golf ball according to claim 3, wherein a hole is provided in said plate, and said coded element mounted on said tongue extends through said hole.

5. A golf ball according to claim 2 wherein the diaphragm is conductive, and said aerial is connected to said diaphragm by a connection passing through said plate.

6. A golf ball according to claim 1, wherein the identification device is a radio frequency identification device.

7. A golf ball according to claim 1, wherein the diaphragm is heat conductive.

8. A golf ball according to claim 7, wherein the diaphragm is steel.

9. A golf ball according to claim 1 wherein the resilient mounting is a spring part.

10. A method of manufacturing a golf ball incorporating an identification device comprising a coded element and an aerial, the method comprising:
    molding a capsule identification device in a capsule member with space for relative movement between the identification device and material of the capsule member, wherein means for protecting the identification device from the effects of impacts are molded in the capsule member;
    adhering parts of a ball core to each other around the capsule member to form an encapsulated capsule member; and,
    providing the encapsulated capsule member with a covering to form a golfball incorporating an identification device comprising a coded element and an aerial.

11. A method according to claim 10, wherein the parts of a ball core form a cuboid shape and are subsequently processed to have a spherical shape.

12. A method of manufacturing a golf ball incorporating an identification device, the method comprising:
    providing an identification device comprising a coded element and an aerial, and a diaphragm, said coded element being mounted on the diaphragm and said diaphragm having a resilient mounting,
    molding the identification device in a capsule member with space for relative movement between the identification device and material of the capsule member, wherein means for protecting the identification device from the effects of impacts are molded in the capsule member,
    adhering the ball core parts to each other around the capsule member, and
    providing the thus-formed core with a covering, wherein means for protecting the identification device from the effects of impacts are molded in the capsule member.

13. A method according to claim 12 wherein the resilient mounting is a spring part.

* * * * *

UNITED STATES PATENT AND TRADEMARK OFFICE
CERTIFICATE OF CORRECTION

| | | |
|---|---|---|
| PATENT NO. | : 7,059,974 B1 | Page 1 of 1 |
| APPLICATION NO. | : 10/019767 | |
| DATED | : June 13, 2006 | |
| INVENTOR(S) | : Steven P. Jolliffe, David V. Jolliffe and Geoffrey Emmerson | |

It is certified that error appears in the above-identified patent and that said Letters Patent is hereby corrected as shown below:

Title page of the Letters Patent, Item (75) Inventors, the spelling of the first named inventor should be: Steven P. Jolliffe Signed and Sealed this Fifteenth Day of August, 2006

JON W. DUDAS
*Director of the United States Patent and Trademark Office*